(12) United States Patent
Tabirian et al.

(10) Patent No.: US 11,543,704 B1
(45) Date of Patent: Jan. 3, 2023

(54) POLYMER NETWORKS STABILIZING LIQUID CRYSTAL DIFFRACTIVE WAVEPLATES

(71) Applicant: Beam Engineering For Advanced Measurement Co., Orlando, FL (US)

(72) Inventors: Nelson V. Tabirian, Winter Park, FL (US); Mark J. Moran, Winter Park, FL (US); Olena Uskova, Winter Park, FL (US); Justin Sigley, Lake Mary, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 245 days.

(21) Appl. No.: 17/086,823

(22) Filed: Nov. 2, 2020

Related U.S. Application Data

(60) Provisional application No. 62/929,456, filed on Nov. 1, 2019, provisional application No. 62/928,728, filed on Oct. 31, 2019.

(51) Int. Cl.
| | |
|---|---|
| *G02F 1/1337* | (2006.01) |
| *G02F 1/1334* | (2006.01) |
| *G02F 1/01* | (2006.01) |
| *G02F 1/137* | (2006.01) |
| *G02F 1/1333* | (2006.01) |

(52) U.S. Cl.
CPC ...... *G02F 1/133788* (2013.01); *G02F 1/0136* (2013.01); *G02F 1/137* (2013.01); *G02F 1/1334* (2013.01); *G02F 1/133371* (2013.01); *G02F 1/133723* (2013.01); *G02F 1/133726* (2021.01);

(Continued)

(58) Field of Classification Search
CPC combination set(s) only.
See application file for complete search history.

(56) References Cited

U.S. PATENT DOCUMENTS

| | | | |
|---|---|---|---|
| 9,617,205 B2 | 4/2017 | Tabirian et al. | |
| 9,658,512 B2 | 5/2017 | Tabirian et al. | |
| | (Continued) | | |

FOREIGN PATENT DOCUMENTS

| | | |
|---|---|---|
| CN | 104345499 A | 2/2015 |
| EP | 0525473 A2 | 2/1993 |
| | (Continued) | |

OTHER PUBLICATIONS

Chien, Chun Yu & Sheu, Chia, "Doping Liquid Crystal Cells with Photocurable Monomer via Holographic Exposure to Realize Optical-Scattering-Free Infrared Phase Modulators with Fast Response Time," Crystals 7, 208, 2017, 10 pages.

(Continued)

*Primary Examiner* — Lauren Nguyen
(74) *Attorney, Agent, or Firm* — Brian S. Steinberger; Hilary F. Steinberger; Law Offices of Brian S. Steinberger, P.A.

(57) ABSTRACT

Methods, materials, systems, and devices for stabilizing photoalignment patterns in liquid crystal diffractive waveplates (LCDWs) against radiation, mechanical, and electrical influences by creating a polymer network within the bulk of LCDW such as the polymer network does not affect the LC orientation pattern in the bulk of the DW and does not result in residual retardation and light scattering while being able to fast switching and relaxation with no haze at application of electric fields.

12 Claims, 7 Drawing Sheets

(52) U.S. Cl.
CPC ...... *G02F 1/13345* (2021.01); *G02F 2203/22* (2013.01)

(56) References Cited

U.S. PATENT DOCUMENTS

| | | | |
|---|---|---|---|
| 9,791,743 | B2 | 10/2017 | Guo et al. |
| 9,983,479 | B2 | 5/2018 | Tabirian et al. |
| 10,031,424 | B2 | 7/2018 | Tabirian et al. |
| 10,114,239 | B2 | 10/2018 | Tabirian et al. |
| 10,197,715 | B1 | 2/2019 | Tabirian et al. |
| 10,423,045 | B2 | 9/2019 | Roberts et al. |
| 10,802,302 | B2 | 10/2020 | Tabirian et al. |
| 2011/0170039 | A1* | 7/2011 | Bos .................. G02F 1/133788 349/88 |
| 2015/0212360 | A1* | 7/2015 | Lee .................. G02F 1/133377 438/30 |
| 2016/0109760 | A1* | 4/2016 | Finnemeyer ...... G02F 1/133377 349/123 |
| 2016/0139054 | A1* | 5/2016 | Tortora .................. G01N 21/77 436/501 |
| 2018/0364526 | A1 | 12/2018 | Finnemeyer et al. |
| 2020/0174323 | A1 | 6/2020 | McGinty et al. |

FOREIGN PATENT DOCUMENTS

| | | |
|---|---|---|
| EP | 0525477 A1 | 2/1993 |
| EP | 2829908 A1 | 1/2015 |

OTHER PUBLICATIONS

Qi Guo, A.K. Srivastava, V.G. Chigrinov and H.S. Kwok, "Polymer and azo-dye composite: a photo-alignment layer for Tiquid crystals", Liquid Crystals 41, 1465-1472, 2014, 10 pages.

Kunihiro Ichimura, "Photoalignment of Liquid-Crystal Systems," Chemistry Reviews 100, 1847-1874, 2000, 28 pages.

Jun Li and Shin-Tson Wu, "Two-coefficient Cauchy model for low birefringence liquid crystals," Journal of Applied Physics 96, 170, 2004, 7 pages.

Elena Ouskova, Rafael Vergara, Jeoungyeon Hwang, David Roberts, Diane M. Steeves, Brian R. Kimball, Nelson Tabiryan, "Dual-function reversible/irreversible photoalignment material," Journal of Molecular Liquids, 267, 205-211, 2018, 7 pages.

Elena Ouskova, Luciano De Sio, Rafael Vergara, Timothy J. White, Nelson Tabiryan, and Timothy J. Bunning, "Ultra-fast solid state electro-optical modulator based on liquid crystal polymer and liquid crystal composites," Applied Physics Letters 105, 231122, 2014, 5 pages.

Takahiro Seki, "New strategies and implications for the photoalignment of liquid crystalline polymers," Polymer Journal 46, 751-768, 2014, 18 pages.

Svetlana V. Serak, Timothy J. Bunning, and Nelson V. Tabiryan, "Ultrafast Photoalignment: Recording a Lens in a Nanosecond", Crystals 7, 338 (1-9), 2017, 9 pages.

N. Tabiryan, D. Roberts, D. Steeves, and B. Kimball, "4G Optics: New Technology Extends Limits to the Extremes," Photonics Spectra, Mar. 2017, pp. 46-50, 5 pages.

Man-Chun Tseng, Oleg Yaroshchuk, Tetyana Bidna, Abhishek Kumar Srivastava, Vladimir Chigrinov and Hoi-Sing Kwok, "Strengthening of Liquid Crystal Photoalignment on Azo Dye Films: Passivation by Reactive Mesogens", RSC Advances 6, 48181, 2016, 8 pages.

Junren Wang, Colin McGinty, Robert Reich, Valerie Finnemeyer, Harry Clark, Shaun Berry and Philip Bos, "Process for a Reactive Monomer Alignment Layer for Liquid Crystals Formed on an Azodye Sublayer," Materials 11, 1195, 2018, 16 pages.

O. Yaroshchuk, V. Kyrychenko, Du Tao, V. Chigrinov, H. S. Kwok, H. Hasebe, and H. Takatsu, "Stabilization of liquid crystal photoaligning layers by reactive mesogens", Applied Physics Letters 95, 021902, 2009, 4 pages.

Oleg Yaroshchuk, and Yuriy Reznikov, "Photoalignment of liquid crystals: basics and current trends," Journal of Materials Chemistry, 48, 24959-25506, 2012, 16 pages.

Chigrinov, V.G., et al. "Photoaligning: Physics and Applications in Liquid Crystal Devices" Wiley, 2008, 230 pages.

\* cited by examiner

A = Phenyl or Cyclohexyl
B = Phenyl or Cyclohexyl
C = Phenyl or Cyclohexyl n = 3 or 6

POLYMER NETWORKS STABILIZING LIQUID CRYSTAL DIFFRACTIVE WAVEPLATES

CROSS REFERENCE TO RELATED APPLICATIONS

This application claims the benefit of priority to U.S. Provisional Application Ser. No. 62/928,728 filed Oct. 31, 2019, and U.S. Provisional Patent Application 62/929,456 filed Nov. 1, 2019. The entire disclosure of each of the applications listed in this paragraph are incorporated herein by specific reference thereto.

FIELD OF INVENTION

This invention relates to stabilizing photoalignment patterns in liquid crystals, and in particular to methods, materials, systems, and devices for stabilizing photoalignment patterns in the bulk of liquid crystal diffractive waveplates.

BACKGROUND AND PRIOR ART

Photoalignment is a common phenomenon in interaction of polarized light with anisotropic molecules. It occurs in many ways—due to direct electromagnetic torque; photoisomerization; polymerization, etc., see, for example, Kunihiro Ichimura, "Photoalignment of Liquid-Crystal Systems," Chem. Rev. 100, 1847-1874, 2000; Oleg Yaroshchuk, and Yuriy Reznikov, "Photoalignment of liquid crystals: basics and current trends," Journal of Materials Chemistry, 48, 24959-25506, 2012; and Takahiro Seki, "New strategies and implications for the photoalignment of liquid crystalline polymers," Polymer Journal 46, 751-768, 2014. Photoalignment reveals itself in numerous ways—in nonlinear optics, photosensitivity, photoactuation. The new, fourth generation optics—diffractive waveplates (DWs),—is perhaps the most important modern application enabled by photoalignment processes, see N. Tabiryan, D. Roberts, D. Steeves, and B. Kimball, "4G Optics: New Technology Extends Limits to the Extremes," Photonics Spectra, March, 2017, pp. 46-50.

Among all different types of materials and processes, one could distinguish two main application requirements: irreversible and reversible photoalignment. Switchable optical components using liquid crystals (LCs) typically require irreversible photoalignment for the optics not to lose its functions when subject to light beams comprising wavelengths in the band of sensitivity of the photoalignment materials. Materials (cinnamates, chalcones and coumarins) and mechanisms known for irreversibility (cross-linking, photodegradation) typically require UV radiation for photoalignment. This imposes a strict limitation to the type of substrates for LC devices—transparency for UV wavelengths.

Photoalignment due to photoisomerization of azobenzene molecules with visible light of wavelengths in blue-green parts of spectrum is preferable for in situ photoalignment of LC cells, but also due to: strong anchoring that it provides for the LC molecules [Vladimir G. Chigrinov, Vladimir M. Kozenkov, Hoi-Sing Kwok, "Photoalignment of liquid crystalline materials," Wiley, 2008, 231 pages.]; high quantum yields ~1 (and thus high efficiency) and related fast photoalignment [Svetlana V. Serak, Timothy J. Bunning, and Nelson V. Tabiryan, "Ultrafast Photoalignment: Recording a Lens in a Nanosecond", Crystals 7, 338 (1-9), 2017]; low-cost of azobenzene dyes; and wide availability of high power visible light sources, including coherent sources adequate for holographic recording.

Azobenzene-based photoalignment layers produce excellent quality for all variety of diffractive waveplates (DWs), including cycloidal DWs (CDWs), DW lenses, vector vortex DWs, arrays of DW lenses and vortices, beam shapers, etc. [Nelson Tabiryan, David Roberts, Diane Steeves, and Brian Kimball, "4G Optics: New Technology Extends Limits to the Extremes," Photonics Spectra, March, 2017, pp. 46-50], however, photoisomerization of azobenzene is reversible hence an ambient light can erase the patterning and render the optical component not functional.

Different ways have been found to stabilize photoalignment in azobenzene dye coatings. Incorporating reactive mesogenes in azobenzene dye solutions has proven to work [Qi Guo, A. K. Srivastava, V. G. Chigrinov and H. S. Kwok, "Polymer and azo-dye composite: a photo-alignment layer for liquid crystals", Liq. Cryst. 41, 1465-1472, 2014; Qi Guo, Abhishek K. Srivastava, Vladimir G. Chigrinov and Hoi Sing Kwok, Stabilized photoalignment layer for liquid crystal, U.S. Pat. No. 9,791,743 B2] particularly, when using monomer compositions possessing room-temperature LC phase [Elena Ouskova, Rafael Vergara, Jeoungyeon Hwang, David Roberts, Diane M. Steeves, Brian R. Kimball, Nelson Tabiryan, "Dual-function reversible/irreversible photoalignment material," Journal of Molecular Liquids, 267, 205-211, 2018]. The photoalignment pattern induced with visible light is stabilized by UV crosslinking the reactive mesogenes in the composition of the photoalignment layer. Subsequent exposure to light does not affect the pattern within certain exposure limits which is high enough for practical applications in case of the monomer compositions possessing room-temperature LC phase.

Passivation of the photoalignment pattern by a thin layer of liquid crystal polymer (LCP) overcoat on photoalignment layer is another solution for stabilization of LC orientation patterns [O. Yaroshchuk, V. Kyrychenko, Du Tao, V. Chigrinov, H. S. Kwok, H. Hasebe, and H. Takatsu, "Stabilization of liquid crystal photoaligning layers by reactive mesogens", Appl. Phys. Lett. 95, 021902, 2009. Man-Chun Tseng, Oleg Yaroshchuk, Tetyana Bidna, Abhishek Kumar Srivastava, Vladimir Chigrinov and Hoi-Sing Kwok, "Strengthening of Liquid Crystal Photoalignment on Azo Dye Films: Passivation by Reactive Mesogens", RSC Advances 6,•48181, 2016] however, it does not allow in situ alignment in LC cells; coating LC cell substrates separately before assembly is not a simple task in case of patterning with high spatial resolution.

A possibility of creating the LCP layer in situ, in a LC cell due to diffusion of monomers from the bulk of a LC to the substrates is feasible [Junren Wang, Colin McGinty, Robert Reich, Valerie Finnemeyer, Harry Clark, Shaun Berry and Philip Bos, "Process for a Reactive Monomer Alignment Layer for Liquid Crystals Formed on an Azodye Sublayer," Materials 11, 1195, 2018], however, the process is rather sensitive to the materials and fabrication processes, and neither high quality, nor electrical switchability of the components produced using this technology have been demonstrated.

Whereas typical layer thickness of azobenzene dye photoalignment layers is only a few nanometers, the LCP layers for photostabilization prove to be considerably thicker resulting in undesirable residual retardation.

Thus, the need exists for solutions to the above problems with the prior art.

In the current study, we show an opportunity of stabilizing the photoalignment pattern in a LC by polymer network. Not only the network is simpler to produce and is not highly sensitive to the materials, it also provides structural stability in addition to the photostability of LC alignment pattern. The polymer network in the bulk of the LC can be optimized to prevent formation of long-lived disclination lines and transient states in the electrical switching process of diffractive waveplates thus also making feasible fast switching and transparency of polymer networked liquid crystal diffractive waveplates (PN-LCDW) both in normal and switched states.

Polymer stabilization of liquid crystalline materials has been widely known in the prior art as described, for example, in "Cross-Linked Liquid Crystalline Systems: From Rigid Polymer Networks to Elastomers (Liquid Crystals)" by D. Broer, G. P Crawford, S. Zumer (Editors), CRC Press, 2011. There is one fundamental issue that makes the effects of polymer networking of LCDWs hard, if possible, at all to foresee or predict. It relates to the critical nature of LC alignment induced by surface alignment layers in DWs. The stability of the LC alignment pattern is a complex function of the elastic constants of the LC along with the surface anchoring forces, cell thickness and the spatial scale of the LC molecular orientation modulation as described in the prior art [H. Sarkissian, B. Park, N. Tabirian, B. Ya. Zeldovich, Periodically aligned liquid crystal: potential application for projection displays, Mol. Cryst. Liquid Cryst., 451, 1-19, 2006]. Thus, the monomers, on one hand, shall not affect the state of LC orientation by changing material properties and, on the other hand, such an inevitable change over the course of polymerization, during which the LC is essentially converted into a gel, does not affect the material properties, such that the molecular orientation pattern is destabilized.

Another fundamental difference between the problem of stabilizing molecular alignment in DWs photoaligned with azobenzene dyes, compared to polymer stabilization of uniform LCs or cholesteric liquid crystals, is that the surface alignment forces in such DWs are changing at the influence of light. Such light-induced changes do not support the original alignment pattern, and moreover, they exert an aligning influence competing with the alignment forces of the bulk network.

Thus, there is no evidence in the prior art that polymer networks could photo or mechanically stabilize LCDWs. Moreover, prior art experiences indicated towards impossibility of such stabilization in LCDWs due to material parameters changing in the polymerization process.

SUMMARY OF THE INVENTION

A primary objective of the present invention is to provide methods, materials, systems, and devices for stabilizing photoalignment patterns in the bulk of liquid crystals using polymer networks stabilizing liquid crystal diffractive waveplates.

Another, the second, objective of the present invention is to provide methods, materials, systems, and devices for stabilizing photoalignment patterns in the bulk of liquid crystals against mechanical influences.

A third objective of the present invention is to provide methods, materials, systems, and devices for fast electrically controlled switching and fast relaxation of liquid crystal diffractive waveplates while maintaining high transparency both in normal and switched states.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1:
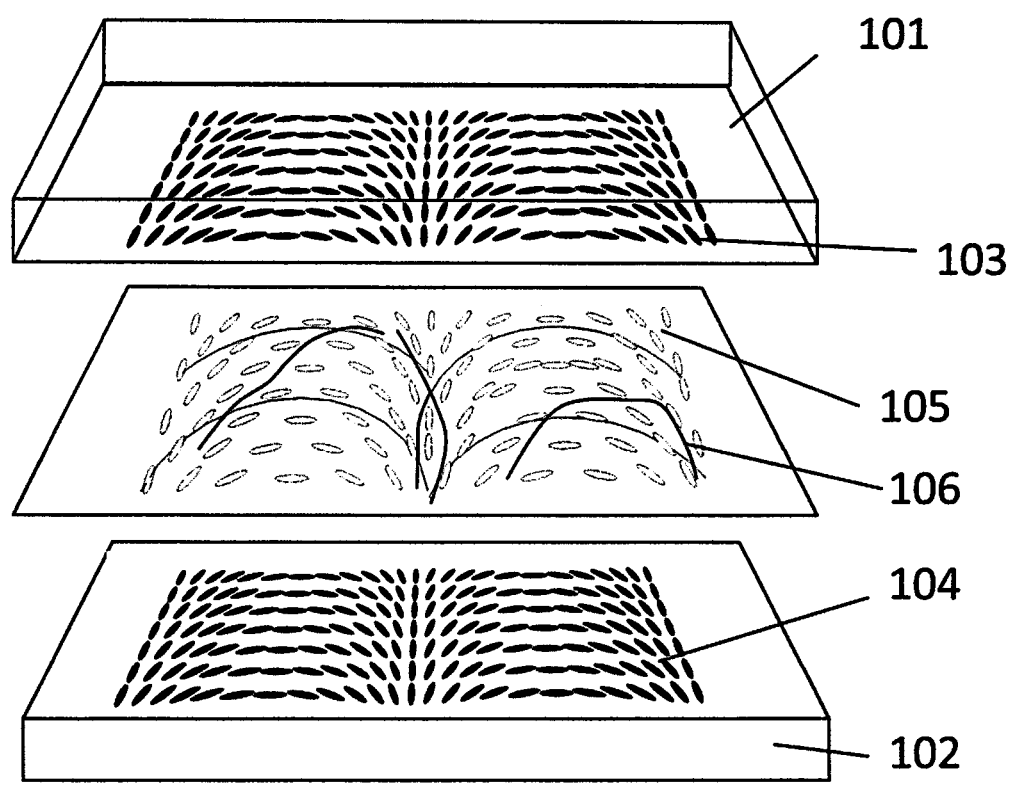
FIG. 1 schematically shows polymer network created in the bulk of the LC aligned with the cycloidally patterned surface photoalignment layers in a cell.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

LCDW Alignment Stabilization Against Mechanical Influences

LC E7 was used in the study leading to the current invention. Other types and classes of LCs with optimized optical properties, high or low birefringence, optimized dielectric properties, with positive and negative dielectric anisotropy, as well as dual frequency, and optimized temperature range of the LC phase well known and developed, particularly, for use in liquid crystal displays (LCDs), spatial light modulators (SLMs), and other LC photonics devices can be used to meet different application requirements.

Different types and concentrations of monomers can be used for creating the polymer network in the compositions of LCs with monomers (LC/PLC compositions). For example, approximately 2.5%, approximately 5%, approximately 10% and approximately 20% (by mass) of room temperature polymerizable LC PLC2014C (BEAM Co.). A photoinitiator required for polymerization, for example, Darocur 4265 (Ciba), can be chosen in small proportion to the monomer content such as, for example, 10%. LC cells can be prepared, for example, using 1 mm thick glass substrates 101 and 102 in FIG. 1, coated with PAAD-72 photoalignment material (BEAM Co.). The molecules of the photoalignment material on top and bottom substrates, 103 and 104, correspondingly, in FIG. 1, are shown patterned for cycloidal diffractive waveplate (CDW) as an example.

The cell gap can vary from approximately 1 μm for making LC DWs for UV and visible wavelengths to 30 μm or higher for making LC DWs for infrared and longer wavelengths to match at least half-wave retardation condition for the wavelength of radiation that is anticipated to be controlled with the LC DW. A pattern corresponding to cycloidal diffractive waveplate (CDW) of approximately 100 μm pitch can be recorded, for example, into the photoalignment in a LC cell of approximately 30 μm cell gap. The recording can be done, for example, using an approximately 200 μm pitch CDW as linear-to-cycloidal polarization converter for a laser beam of approximately 447 nm wavelength and approximately 100 mW/cm$^2$ power density by approximately 15 min exposure. The cell, after recording, is filled with the LC 105 comprising a monomer that is polymerized by approximately 15 min exposure to unpolarized UV light of approximately 379 nm wavelength and 20 mW/cm$^2$ power density, for example, to create the polymer network 106 in FIG. 1.

The obtained DWs, CDW as an example, can be of very high quality for a wide range of the polymer network content. However, the LC DW is mechanically stable—the LC alignment pattern does not change under localized moderate mechanical pressure—starting from approximately 15% for polymer networks made with PLC2014C (BEAM Co.). The cells with lower concentrations of the PLC are transferred to a hazy state with mechanical pressure; the transparency was restored though within several minutes.

Photoalignment Stabilization

Figure 2:
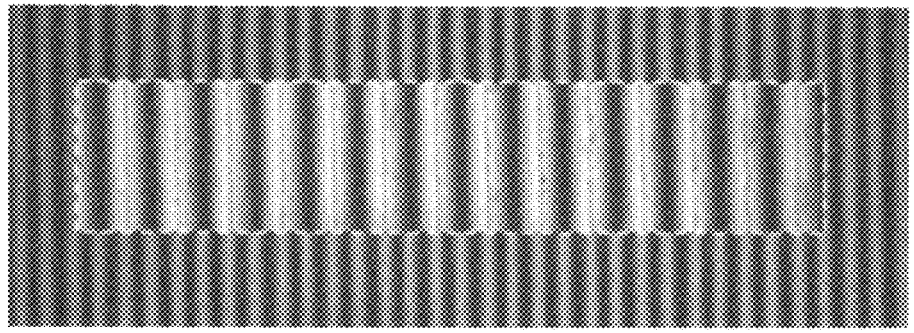
FIG. 2 shows CDW textures produced for liquid crystal E7 comprising polymer network made of approximately 2.5% (by mass) polymerizable liquid crystal PLC2014C (BEAM Co.) before and after (insert) irradiation observed between crossed polarizers (approximately 100× magnification).

The photostability of the photoalignment of LC in cells can be verified by irradiating the LC CDW fabricated as described above with linearly polarized laser beam of approximately 447 nm wavelength and approximately 300 mW/cm$^2$ power density for approximately 15 min. Radiation exposure changes the texture of CDWs containing PLC of up to approximately 7.5% concentration, FIG. 22, by generating typical defect wall lines. FIG. 2 shows polymer stabilized LC CDW textures for LC E7 comprising approximately 2.5% PLC2014C before and after (insert) irradiation observed between crossed polarizers (100× magnification).

Figures 3A, 3B:
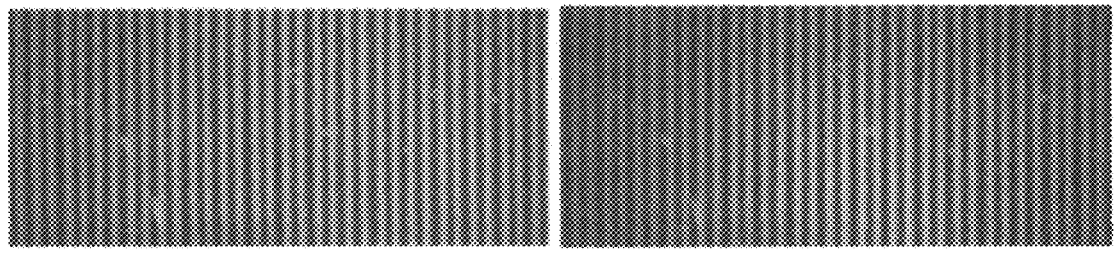
FIGS. 3a and 3b show CDW textures for liquid crystal E7 comprising polymer network made of 10% (by mass) polymerizable liquid crystal PLC2014C (BEAM Co.) (3a) before and (3b) after irradiation observed between crossed polarizers (approximately 100× magnification).

The LC CDW texture is not affected by radiation even during approximately 60 min of exposure time at approximately 10% of PLC2014C concentration in E7 FIGS. 3a and 3b. FIGS. 3a and 3b show LC CDW textures for LC E7 comprising approximately 10% PLC2014C (a) before and (b) after irradiation observed between crossed polarizers (100× magnification).

The cell with approximately 20% of PLC in E7 is also stable to re-irradiation of LC CDW maintaining optical quality. The lowest concentration providing stability of photoalignment is 8% for polymer network produced with PLC2014C, approximately 5% for polymer network produced with RM802 (BEAM Co.); and can be even as small as approximately 3% for RM257 (Merck).

Electrical Stability

Figure 4A:
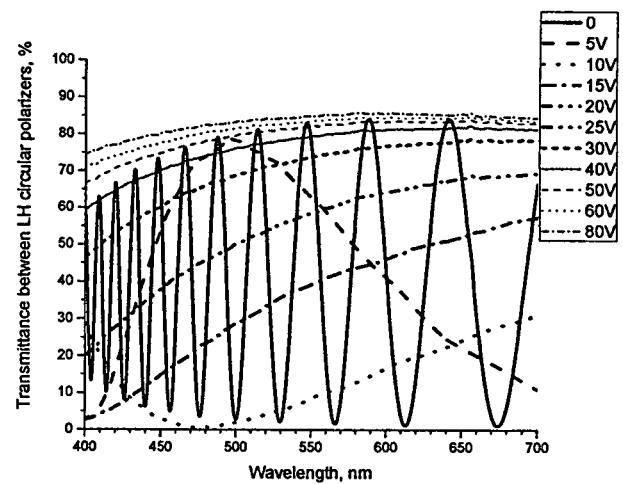
FIG. 4a shows transmission spectra corresponding to the 0th order diffraction efficiency of PN-LC-CDW (E7+10% PLC2014C) between parallel circular polarizers as a function of voltage.
Figure 4B:
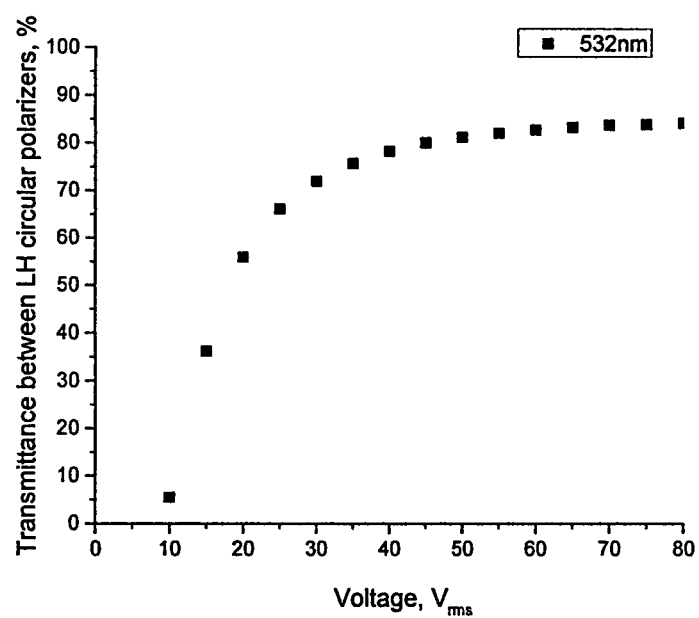
FIG. 4b shows a graph of 0th order diffraction efficiency as a function of voltage for a given wavelength, approximately 532 nm.

The effect of voltage on transmission spectra of an approximately 30 μm thick polymer stabilized LC CDW (E7+10% PLC2014C) between circular polarizers is shown in FIGS. 4a and 4b. All minima correspond to wavelengths meeting half-wave retardation condition. Half-wave retardation of 0th order is obtained for visible wavelength at voltage values as low as—approximately 10 V, FIG. 4a. No diffraction is present and the transmission does not change above approximately 80 Vrms, FIG. 4a shows transmission spectra of LC CDW E7+ approximately 10% PLC2014C between parallel (left-hand) circular polarizers ($0^{th}$ order diffraction efficiency) as a function of voltage. FIG. 3b shows a graph of $0^{th}$ order diffraction efficiency as a function of voltage for a given wavelength.

In all the polymer networked systems discussed above, the diffraction could be switched off at millisecond scale but the relaxation to the diffractive state took minutes. Switching characteristics were not affected by the exposure of the CDW to high dosages of radiation mentioned above.

Materials for Haze-Free Switching of Polymer Stabilized Liquid Crystal Diffractive Waveplates Molecular Design:

Polymer stabilization of a LC involves developing a polymer network within the LC sample, which imparts a memory effect in the ground state such as once an external stimulus (e.g., electric field) is removed the LC molecules elastically relax back to this ground state. By "memorizing" the ground state set by the azobenzene-based photoalignment layer the polymer matrix essentially becomes the new alignment layer. Thus, the original azobenzene-based photoalignment layer becomes redundant and exposure to visible light, while still erasing the photo-patterning of the azobenzene layer, will not affect the optical component.

One principal drawback of employing polymer stabilization for switchable optics wherein LC molecules are realigned between planar and homeotropic states is typically a large index mismatch between the homeotropically aligned LC and polymer network, see Chien, Chun Yu & Sheu, Chia, "Doping Liquid Crystal Cells with Photocurable Monomer via Holographic Exposure to Realize Optical-Scattering-Free Infrared Phase Modulators with Fast Response Time," Crystals 7, 208, 2017; Elena Ouskova, Luciano De Sio, Rafael Vergara, Timothy J. White, Nelson Tabiryan, and Timothy J. Bunning, "Ultra-fast solid state electro-optical modulator based on liquid crystal polymer and liquid crystal composites," Applied Physics Letters 105, 231122, 2014.

This index mismatch induces light scattering unacceptable for many applications. One means of decreasing the index mismatch between LC and polymer network is to use a lower index polymer network. This can be accomplished by mixing monomers with high and low birefringence to tune the index to closely match that of the homeotropic aligned LC, see Elena Ouskova, Luciano De Sio, Rafael Vergara, Timothy J. White, Nelson Tabiryan, and Timothy J. Bunning, "Ultra-fast solid state electro-optical modulator based on liquid crystal polymer and liquid crystal composites," Applied Physics Letters 105, 231122, 2014.

This, however, tends to lead to a high density of alkyl chains which can phase-separate into hydrophobic clusters and reduce uniformity of the network.

Using room temperature polymerizable liquid crystal mixture PLC-2014C, these mixtures show no observable scattering upon switching from the cycloidal orientation to homeotropic alignment via electric field. The lack of significant scatter is consistent with a realignment of the polymer matrix. This could be possible as the PLC-2014C is composed of crosslinking groups and mono-acrylates, some of which possess large dielectric anisotropy, which, if sufficiently flexible, could align with an external electric field. However, the relaxation of the homeotropoic state back to the CDW is on the order of minutes unacceptable for many switchable optical components. This, in conjunction with the shortcomings of high concentrations of flexible, low index monomers, necessitates the need for a rigid, strongly cross-linked polymer network for optimal electro-optical properties.

Rigid crosslinking group that has a lower index than traditional reactive mesogenes (ie, RM-257, RM-82, etc.) while maintaining a very rigid structure in order to obtain very good thermal relaxation from the homeotropic state are needed.

Figure 5A:
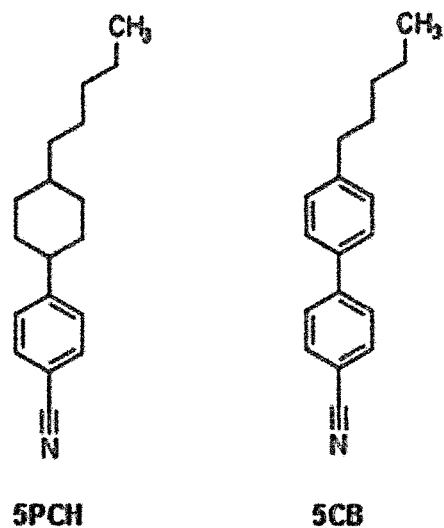
FIG. 5a shows sample structures of simple liquid crystals.

One method of simultaneously decreasing birefringence while maintaining the rigidity similar to a phenyl group is the introduction of cyclohexane moieties. Such substitutions, in calamitic (rod-shaped) LCs are well-known to promote liquid crystallinity while simultaneously lower the birefringence relative to phenyl. For example, comparing two liquid crystals 5CB and 5PCH which are very similar in structure, but possess quite different birefringence values ($\Delta n_{5CB}$=ca. 0.165; $\Delta n_{5PCH}$=0.120), see FIG. 5a [Jun Li and Shin-Tson Wu, "Two-coefficient Cauchy model for low birefringence liquid crystals," Journal of Applied Physics 96, 170, 2004].

Figure 5B:
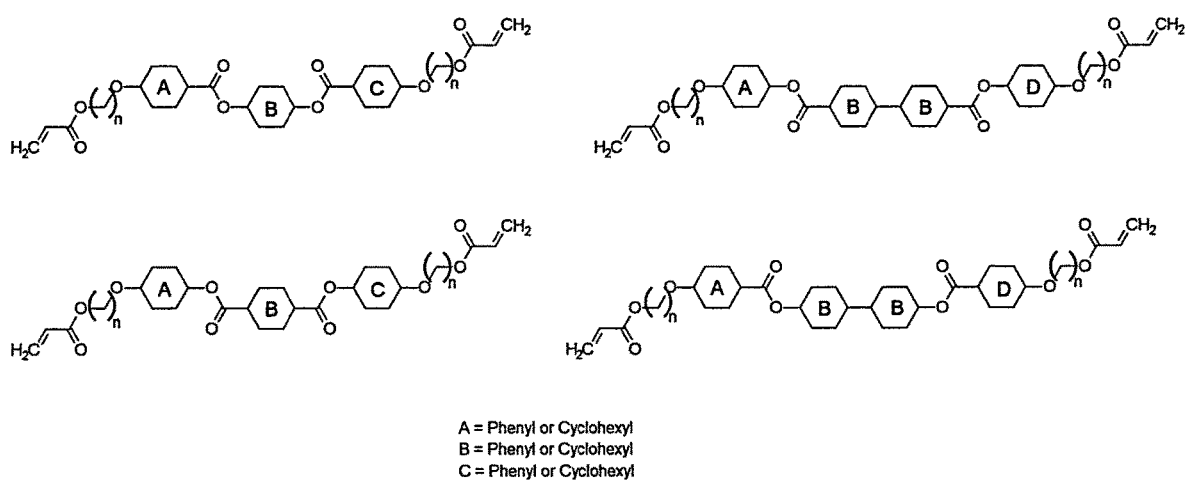
FIG. 5b shows sample structures of cross-linking monomers to tune the index for minimizing scattering in the electrically aligned (homeotropic) state.

Compounds with a mixture of three (3) or four (4) phenyl and cyclohexyl groups, comprising a rigid core, linked by ester moieties with pedant acrylate groups can be employed. The scope of these compounds is not limited to these six-membered rings. Other aromatics such as, but not limited to naphthyl, thiophenyl, pyrimidinyl, pyridinyl, etc. along with the introduction of lateral substituent(s) (eg, F, Cl, Br, Me, Et, $NO_2$, $CF_3$, etc) and other aliphatics, such as [2.2.2.]bicyclooctyl, can be employed to carefully tune mesogenic properties and refractive indices. All such structures are rod-shaped and integrate well into a liquid crystalline matrix, particularly at low concentration. These compounds are preferentially liquid crystalline to improve miscibility and reduce crystallization in such mixtures. FIG. 5b shows typical structures of the type disclosed in this invention.

FIG. 5b shows typical structures of cross-linking monomers to tune the index for minimal scattering in the homeotropic state.

Figure 5C:
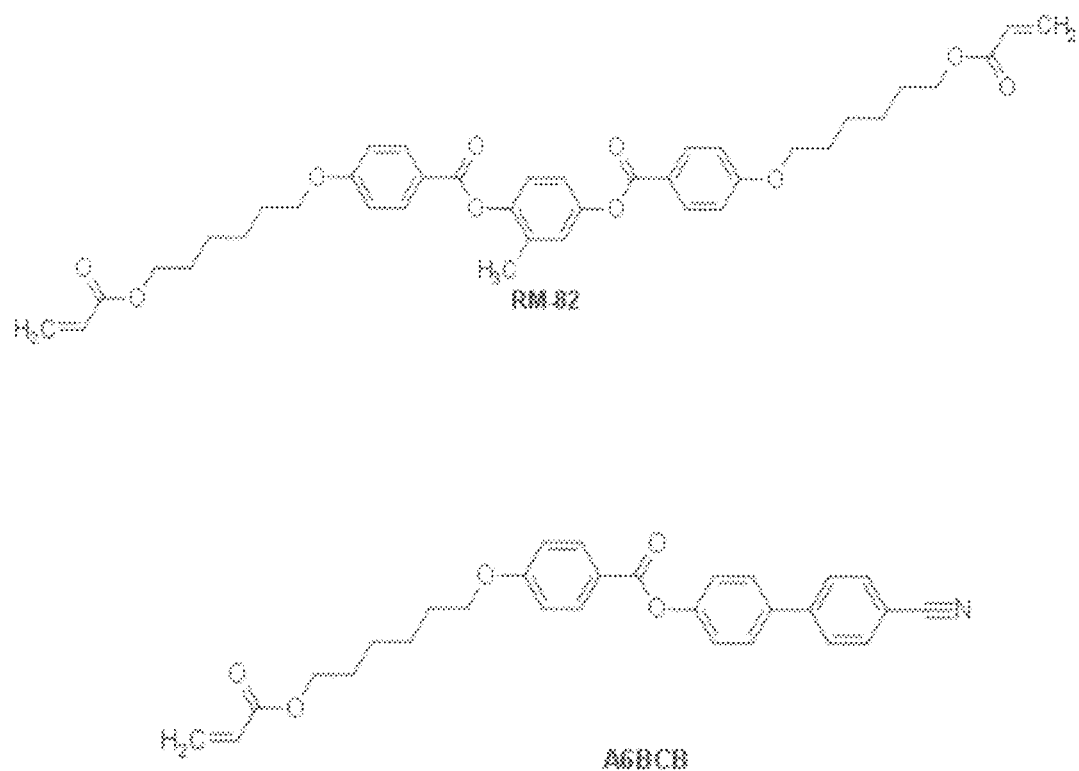
FIG. 5c shows structures of RM-82 with A6BCB monomers that are used as an example, in approximately 1:1 mixture for creating photostabilizing polymer matrix in LCDW.

Mixtures:

Based on the performance of PLC-2014c as a photostabilizing polymer matrix shown in FIG. 5c that shows no appreciable scatter, we introduce an approximately 1:1 mixture of RM-82, with A6BCB, a monomer with high dielectric constant at approximately 5 wt. % as the polymer network in high dielectric constant low birefringence LC mixture XENA 5 (BEAM Co.). This mixture does not behave like PLC-2014c (i.e., realignment of the polymer network with an electric field), and thus scatter is observable. In order to compensate the index mismatch, RM-82 is mixed with low index aliphatic diacrylate.

With concentrations of the aliphatic diacrylate as high as approximately 55%, by mass, polymer stabilized mixtures still show significant scattering in the homeotropic state, suggesting that such mixtures are inappropriate for switchable CDWs.

Low concentrations of a reduced-index mesogenic cross-linker of the type in FIG. 5b (ca. 4%) show very good stabilization of the LC, however, there is noticeable scatter in the homeotropic state. Thus even this lower birefringence mesogenic crosslinker is insufficient as a polymer matrix for switchable CDWs on its own. To offset the index, a small amount of aliphatic diacrylate can be added to the mixture. This doping, while reducing the effective scattering in the homeotropic state, limits the performance in terms of spontaneous (thermal) relaxation speed. A mixture of approximately 2.5:1 mesogenic crosslinker aliphatic diacrylate doped into XENA5 at approximately 5.2%, after photopolymerization (30 minutes at approximately 5 $mW/cm^2$), demonstrates fast switching and relaxation, for example, in an approximately 5 µm anti-parallel aligned polyimide LC cell. Driving the sample with an A/C field (square wave, approximately 30 V) the planar and homeotropic states are clear and virtually indistinguishable by eye when viewed through crossed polarizers to verify switching of LC XENA5.

Referring to FIGS. 6a, 6b, 6c and 6d, it is important to note that much better transmittance is achieved with this mixture than with traditional unsaturated mesogenic crosslinkers (eg. RM-82), even with much higher concentration of low-index aliphatic diacrylate.

Figure 6A:
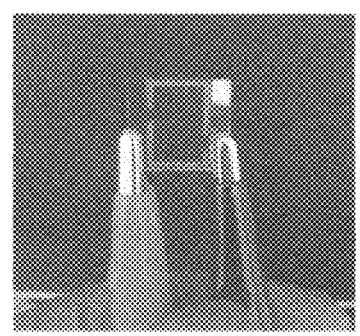
FIGS. 6a, 6b, 6c and 6d show switching of an approximately 5.2% mixture of approximately 2.5:1 mesogenic aliphatic crosslinker in a polyimide cell. a) no applied field in the absence of polarizers; b) no applied field between crossed polarizers; c) approximately 30 V A/C field in the absence of polarizers, and; d) approximately 30 V A/C field between crossed polarizers.
Figure 6B:
Figures 6C, 6D:
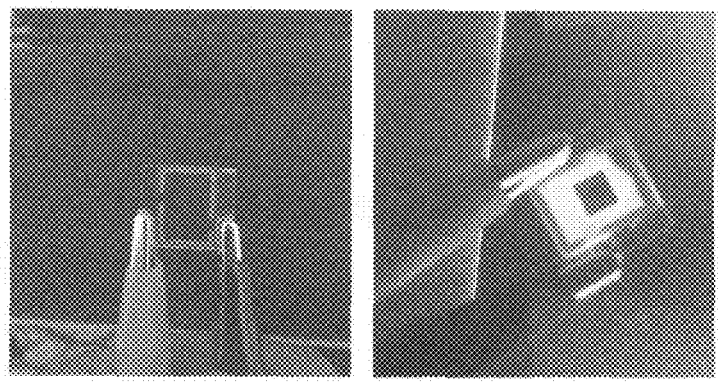

Referring to FIGS. 6a, 6b, 6c and 6d, switching of an approximately 5.2% mixture of approximately 2.5:1 mesogenic crosslinker aliphatic diacrylate in a polyimide cell, FIG. 6a shows no applied field in the absence of polarizers; FIG. 6b shows no applied field between crossed polarizers; FIG. 6c shows 30 V A/C field in the absence of polarizers, and; FIG. 6d show an approximately 30 V A/C field between crossed polarizers.

Figure 7:
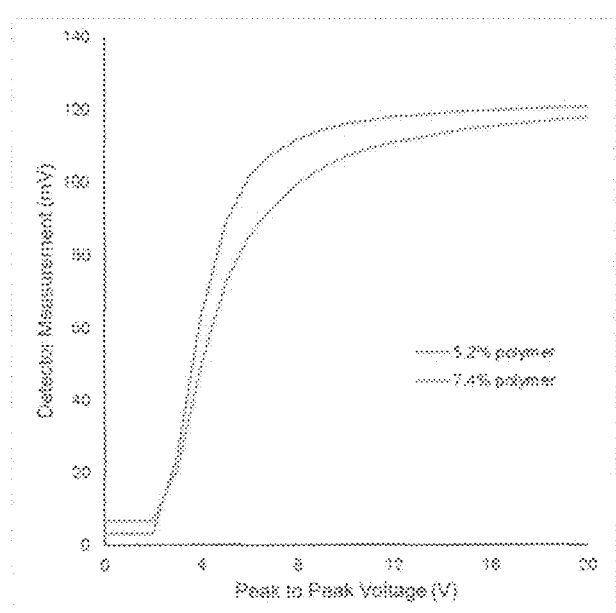
FIG. 7 shows a graph of switching polymer stabilized liquid crystal samples with low scattering and fast relaxation.

This mixture provides the stabilizing properties also, for example, in approximately 3 µm thin LC CDW cell photoaligned using PAAD-72 photoalignment layer. The threshold voltage for switching can be determined with a photodetector, where in the planar state most of the light is diffracted by the CDW, while in the homeotropic state the light is free to pass through to the detector. FIG. 7 is a graph showing switching polymer stabilized liquid crystal samples with low scattering and fast switching and relaxation, approximately 1.2 ms for the rise time, and approximately 16.6 ms for relaxation.

In the interest of increasing the thermal relaxation speed without drastically increasing scattering, a sample with a higher concentration of polymer can be made. This sample possess a slightly higher concentration of aliphatic diacrylate, to further offset the index. Thus, an approximately 7.4% mixture of approximately 2:1 mesogenic crosslinker aliphatic diacrylate in XENA5 can be prepared, loaded into a CDW cell and polymerized. The threshold voltage is slightly higher than that of the approximately 5.2% sample, as shown in FIG. 7. The transmittance only increases by a small amount, approximately 0.2%, to approximately 4.5%, Despite an approximately. 42% increase in polymer concentration. The increase in aliphatic diacrylate concentration does not appreciably affect the electro-optical response. The rise time for the embodiment discussed above was measured to be approximately 1.1 ms, while the thermal relaxation increased by approximately 1 ms to approximately 17.3 ms. This shows the importance of the rigidity of the crosslinker, as by increasing the concentration of the flexible aliphatic diacrylate the relaxation speed of the sample decreases, despite an approximately 42% increase in total polymer concentration (i.e., approximately 5.2% to approximately 7.4%).

Figure 8A:
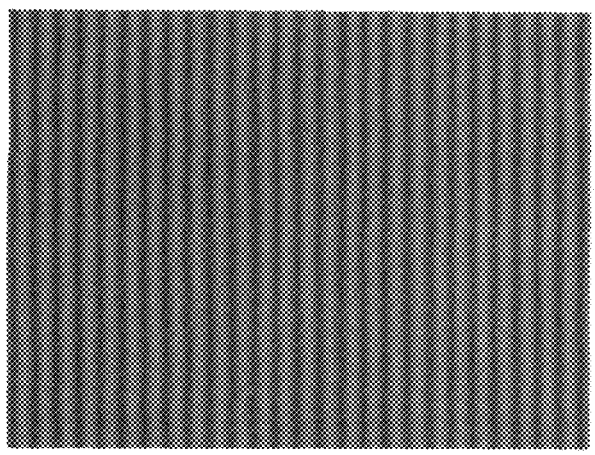
FIG. 8a shows a photo of the novel polymer stabilized LC CDW texture between crossed polarizers before radiation.
Figure 8B:
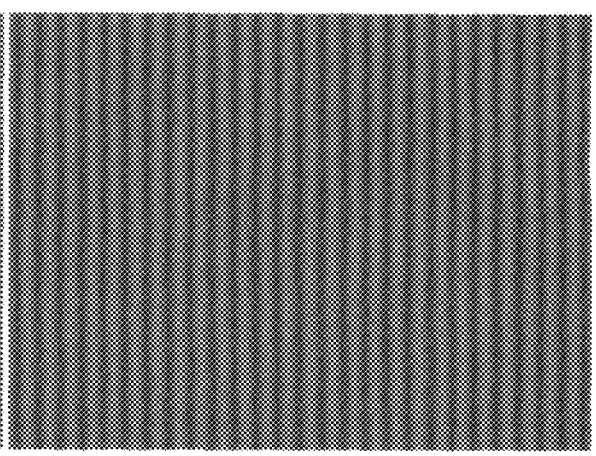
FIG. 8b shows a photo of the novel polymer stabilized LC CDW texture between crossed polarizers after radiation.

FIGS. 8a and 8b show photos of the polymer stabilized LC CDW texture between crossed polarizers (FIG. 8a) before and (FIG. 8b) after irradiation.

This crosslinker is important for switchable optics that require low scattering in the electrically aligned (homeotropic) state and fast relaxation to the ground state.

The term "approximately" is similar to the term "about" and can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of stabilizing photoalignment patterns in the bulk of liquid crystal diffractive waveplates, the method comprising the steps of:
    providing a photoalignment material at least in part comprising anisotropic molecules with absorption spectra peak at different wavelengths for light polarized along and perpendicular to the axis of the anisotropic molecules;
    providing a linearly polarized light beam comprising wavelengths in one of the absorption bands of said anisotropic molecules;
    providing substrates having conductive layers transparent at least for the wavelengths of the polarized light beam;
    coating said substrates with the photoalignment material layer said layer being thin enough not to introduce phase retardation larger than a small fraction of the wavelength in said light beam;
    assembling said substrates into a cell with a predetermined cell gap;
    subjecting said cell to the polarized light beam for a time period long enough for formation of the anisotropic molecular order in the photoalignment material layer;
    filling the cell with a liquid crystal mixture comprising in part polymerizable moieties and photoinitiator; and
    creating a polymer network within the liquid crystal by polymerization of said polymerizable moieties.

2. The method of claim 1, wherein said polymerizable moieties comprise monomers having a rigid backbone, flexible backbone, or mixtures thereof for stabilizing mechanical, optical, and electro-optical properties of the liquid crystal cell.

3. The method of claim 1, wherein said photoalignment material contains azobenzene moieties.

4. The method of claim 1, wherein linear polarization of said light beam varies as a function of spatial coordinates at least one of the coordinate axes, this function comprising at least one from the list of: linear function, and parabolic function.

5. The method of claim 1, wherein the concentration of said polymerizable moiety in said liquid crystal is selected to provide mechanical stability to the cell.

6. The method of claim 1, wherein the concentration of said polymerizable moiety is optimized to provide fast switching and relaxation of liquid crystal upon application of electric field.

7. The method of claim 1, wherein the concentration and refractive indices of said polymerizable moiety is optimized not to generate light scattering in electrical switched state.

8. Liquid crystal diffractive waveplates with photoalignment patterns stabilized in the bulk of the liquid crystals by a polymer network.

9. The liquid crystal diffractive waveplates of claim 8 wherein said polymer network comprises monomers having a rigid backbone, flexible backbone, or mixtures thereof for stabilizing mechanical, optical, and electro-optical properties of the liquid crystal cell.

10. The liquid crystal diffractive waveplates of claim 8, wherein the polymer network in said liquid crystal is selected to provide mechanical stability to the liquid crystal diffractive waveplates.

11. The liquid crystal diffractive waveplates of claim 8, wherein the concentration of said polymer network is optimized to provide fast switching and relaxation of liquid crystal upon application of electric field.

12. The liquid crystal diffractive waveplates of claim 8, wherein the concentration and refractive indices of polymer network is optimized not to generate light scattering in electrical switched state.

* * * * *